United States Patent Office 3,336,347
Patented Aug. 15, 1967

3,336,347
17α-ETHINYL-Δ$^{1,3,5(10)}$-ESTRATRIENE-3,16α,17β-TRIOL AND ITS ESTERS AND ETHERS
Otto Engelfried, Heinz Gibian, Friedmund Neumann, and Rudolf Wiechert, all of Berlin, Germany, assignors to Schering, A.G., Berlin, Germany
No Drawing. Filed Nov. 5, 1965, Ser. No. 506,581
Claims priority, application Germany, Nov. 17, 1964, Sch 36,113
9 Claims. (Cl. 260—397.5)

The invention relates to estrogenic steroids, particularly to 17α-ethinyl-Δ$^{1,3,5,(10)}$-estratriene-3,16α,17β-triol and its esters and ethers of the formula

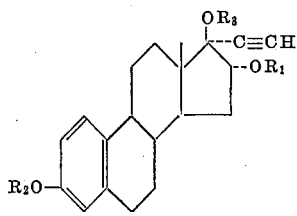

wherein $R_1$, $R_2$, and $R_3$ may be hydrogen, alkyl, or acyl. "Acyl" is to be understood as being an acid radical usual in steroid chemistry. The esters to be considered are those of physiologically tolerated organic acids such as straight-chained, branched, and cyclic aliphatic mono and polybasic fatty acids having up to 12 C atoms, which may be saturated or unsaturated, aromatic or mixed aromatic-aliphatic and hetero-cyclic acids. The acids mentioned may be substituted by halogen, oxo, free or etherified hydroxyl groups in any position.

The alkyl radicals may be lower aliphatic alkyls.

The compounds of the invention are prepared in a manner known in itself by conversion of the 17-keto group of 16α-hydroxyestrone or of its esters and ethers into the 17α-ethinyl-17β-hydroxy configuration. This conversion may be carried out for example, in an advantageous manner by Grignard reaction of the corresponding 17-keto compounds with ethinylmagnesium halides, and the primary products formed may thereafter be acylated and/or etherified or subject to saponification and/or ether splitting if so desired. The Grignard reaction is preferably carried out in the absence of atmospheric oxygen, and preferably in a protective gas atmosphere such as argon and nitrogen which are suitable protective gases.

The compounds of the invention are distinguished by surprisingly strong estrogenic effects when applied orally. The superior effects of the compounds of the invention are illustrated in the following table for the example of 17α-ethinyl-Δ$^{1,3,5,(10)}$-estratriene-3,16α,17β-triol as compared to the known 17α-ethinyl-Δ$^{1,3,5,(10)}$-estratriene-3,17β-diol.

TABLE

| Substance: | Estrogenic effect,[1] micrograms |
|---|---|
| (I) 17α-ethinyl-Δ$^{1,3,5,(10)}$-estratriene-3,16α,17β-triol | 3 |
| (III) 17α-ethinyl-Δ$^{1,3,5,(10)}$-estratriene-3,17β-diol | 10-30 |

[1] Threshold value in oral application in the Allen-Doisy test.

The compounds of the invention may be employed in the forms of applications common in pharmaceutical practice, for example, in pills, capsules, powders, tablets, suspensions, and the like.

The indications for medicinal compositions based on the compounds of the invention are those ailments in which treatment with estrogen, or a combination of estrogen with substances having gestagenic effects is called for, such as the climacteric, and its sequellae, amenorrhea, diagnosis of early pregnancy, disturbances of peripheral circulation; in combination for example, with norethisterone acetate the compounds of the invention may also be employed as contraceptives.

With the above features in view, the following examples are intended to illustrate the invention.

Example 1

1 gram 16α-hydroxyesterone diacetate is dissolved in 25 ml. tetrahydrofuran and added to a solution of ethinyl-magnesium bromide prepared in a conventional manner from 4.16 g. magnesium by way of ethylmagnesium bromide, and the reaction mixture is heated 20 hours to 70° C. under argon. After cooling, using for example, ice water, decomposition is effected with saturated ammonium chloride solution, and the resulting product is extracted with ethyl ether. The washed and dried ether solution is evaporated, the residue is repeatedly boiled with hexane, and is then recrystallized several times from ethyl acetate. There is obtained 17α-ethinyl-Δ$^{1,3,5,(10)}$-estratriene-3,16α, 17β-triol of M.P. 220–226° C. (decomp.). The yield of this product is 35% of theory.

Example 2

100 mg. of 17α-ethinyl-Δ$^{1,3,5,(10)}$-estratriene-3,16α,17β-triol named in the above table are dissolved in 0.5 ml. pyridine, 0.5 ml. acetic anhydride are added, and the mixture is left standing overnight at room temperature. A precipitate is formed by addition of ice water, and the crude acetylation product is recrystallized from a mixture of methylene chloride and hexane. The resultant 17α-ethinyl-Δ$^{1,3,5,(10)}$-estratriene - 3,16α,17β - triol - 3,16-di-acetate melts at 178–180° in the Kofler (melting point) apparatus after having undergone crystal conversion at about 163° C. In this case the yield is 76% of theory.

Example 3

The 3,16-dipropionate is obtained from 17α-ethinyl-Δ$^{1,3,5,(10)}$-estratriene-3,16α,17β-triol with propionic anhydride in a manner analogous to the procedure of Example 2. The pure compound recrystallized from methylene chloride-hexane melts at 131.5–132° C. The yield is 65% of theory.

Example 4

When 3 g. 16α-hydroxyestrone-3-methyl ether 16-acetate is reacted with HC≡CMgBr in a manner analogous to Example 1, there is obtained 17α-ethinyl-Δ$^{1,3,5,(10)}$-estratriene-3,16α,17β-triol-3-methyl ether. The crude product is purified by extracting it twice or three times with hot hexane, and by recrystallizing the sparingly soluble fraction (2.25 g.) from ethyl acetate. The compound when analytically pure melts at 184–185° C. (decomposition). Also, the yield is 35% of theory.

Example 5

When the 3-methyl ether described in Example 4 is reacted with acetic anhydride in pyridine overnight at room temperature, there is obtained 17α-ethinyl-Δ$^{1,3,5(10)}$-estratriene - 3,16α,17β - triol - 3 - methyl ether-16 acetate. When recrystallized from hexane-methylene chloride mixture, the pure compound melts at 130–132° C. The yield of the final product is 52% of theory.

Example 6

2.5 g. 17α-ethinyl-Δ$^{1,3,5,(10)}$-estratriene-3,16α,17β-triol are dissolved in 10 ml. pyridine. 10 ml. n-butyric anhydride are added and the mixture is left standing overnight at room temperature. Ice water is added, and a precipitate of 3.57 g. crude 3,16-di-n-butyrate is obtained. When recrystallized from hexane, the pure compound melts at 105–106° C. The yield of the final product is 78% of theory.

Example 7

1.3 g. 17α-ethinyl-Δ$^{1,3,5,(10)}$-estratriene-3,16α,17β-triol-3,16-diacetate are suspended in 11 ml. acetic anhydride, the suspension is mixed with 74 mg. p-toluenesulfonic acid in 4.4 ml. acetic anhydride, and the mixture is stirred for 18 hours at room temperature. Ice water is added to induce precipitation, and the crude triacetate is recrystallized from a methylene chloride-hexane mixture, the proportion of which is 1:19. There is obtained 0.9 g. 17α-ethinyl-Δ$^{1,3,5,(10)}$ - estratriene - 3,16α,17β - triol-triacetate which melts at first at 170–175° C. After having been stored for several weeks, the compound melts at 160–161° C. The yield is 49% of theory.

Example 8

When 1.5 g. 17α-ethinyl-Δ$^{1,3,5,(10)}$-estratriene-3,16α,17β-triol-3,16-di-n-butyrate is reacted with acetic anhydride in a procedure analogous to that of Example 7, 1.6 g. 17α-ethinyl-Δ$^{1,3,5,(10)}$-estratriene - 3,16α,17β - triol - 3,16-di-n-butyrate-17-acetate of melting point 85–88° C. are obtained as a crude product. The pure compound recrystallized from hexane melts at 91–93° C. The yield is 68% of theory.

We claim:
1. Compounds of the formula

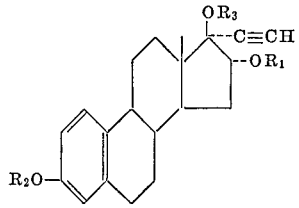

wherein $R_2$ is hydrogen, lower alkyl, or acyl, and $R_1$ and $R_3$ are hydrogen or acyl.

2. 17α-ethinyl-Δ$^{1,3,5,(10)}$-estratriene-3,16α,17β-triol.
3. 17α-ethinyl-Δ$^{1,3,5,(10)}$-estratriene-3,16α-17β-triol-3,16-diacetate.
4. 17α-ethinyl-Δ$^{1,3,5,(10)}$-estratriene-3,16α,17β-triol-3,16-dipropionate.
5. 17α-ethinyl-Δ$^{1,3,5,(10)}$-estratriene - 3,16α,17β - triol-3-methyl ether.
6. 17α-ethinyl - Δ$^{1,3,5,(10)}$ - estratriene-3,16α,17β-triol-3-methyl ether-16-acetate.
7. 17α-ethinyl - Δ$^{1,3,5,(10)}$ - estratriene - 3,16α,17β-triol-3,16α-di-n-butyrate.
8. 17α - ethinyl - Δ$^{1,3,5,(10)}$ - estratriene-3,16α,17β-triol-3,16α,17β-triacetate.
9. 17α-ethinyl-Δ$^{1,3,5,(10)}$ - estratriene - 3,16α,17β - triol-3,16α-di-n-butyrate-17-acetate.

References Cited

UNITED STATES PATENTS 2,949,476    8/1960    Tyner _____ 260—397.5

OTHER REFERENCES

Fieser et al.: Steroids, New York, Reinhold, 1959, pp. 476 and 477.

LEWIS GOTTS, *Primary Examiner.*

ELBERT L. ROBERTS, *Examiner.*

THOMAS M. MESHBESHER, *Assistant Examiner.*